Feb. 13, 1951     H. M. WADSWORTH     2,541,897
VARIABLE ELECTRICAL CONDENSER
Filed April 21, 1949     2 Sheets-Sheet 2
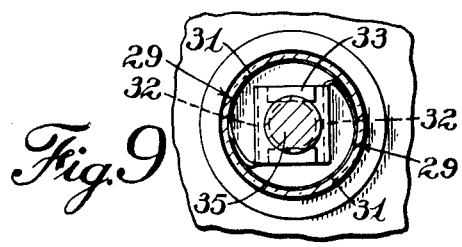
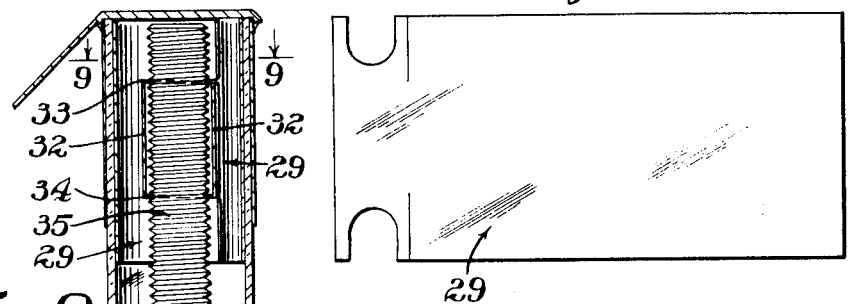
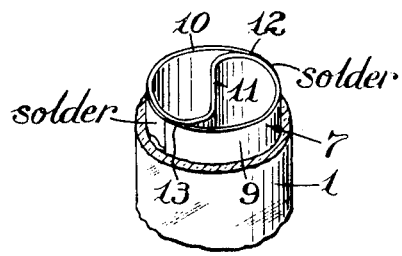
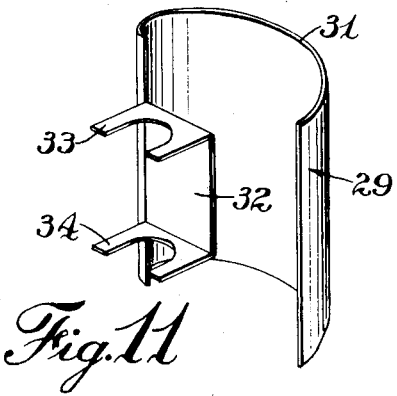
INVENTOR.
Howard M. Wadsworth
BY
Clinton S. James
ATTORNEY
WITNESS:

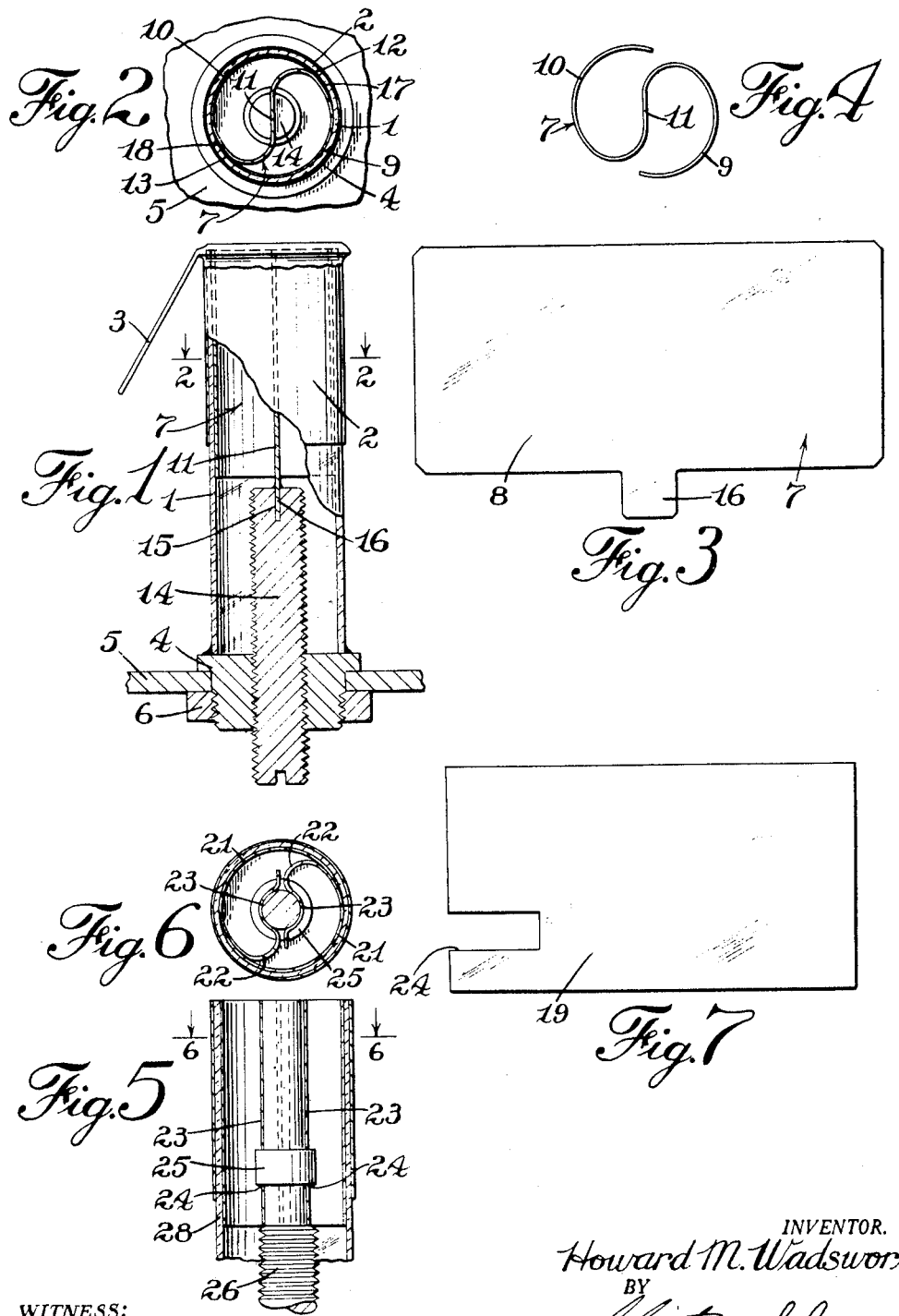

Patented Feb. 13, 1951

2,541,897

UNITED STATES PATENT OFFICE 2,541,897

VARIABLE ELECTRICAL CONDENSER

Howard M. Wadsworth, Liverpool, N. Y.

Application April 21, 1949, Serial No. 88,743

6 Claims. (Cl. 175—41.5)

1

The present invention relates to a variable electrical condenser and more particularly to a so called "trimmer" condenser of the tubular type.

Tubular trimmer condensers as now commonly used to assist in tuning high-frequency oscillating circuits comprise a tube of suitable dielectric material such as glass or plastic, having a conductive sleeve or coating extending from one end somewhat less than half the length of the tube, forming one "plate" or electrode of the condenser; and an internal slug or piston of conductive material such as a section of metallic rod, also of less than half the length of the tube, slidably mounted in the tube and forming the other electrode of the condenser; with micrometer means for adjusting the interior electrode longitudinally in the tube to thereby vary the telescopic relation of the electrode and consequently the capacity of the condenser.

While condensers of this type have received very wide acceptance in radio and video instruments, they have heretofore been subject to a number of limitations and disadvantages due in large measure to the practical impossibility of securing economically dielectric tubing of accurate and uniform dimensions. In particular, the tubing which is commercially available is subject to significant variations in internal diameter as between various lots of tubing; and the internal surface is commonly "out of round" or oval in varying amounts, and with the major axes of the sections at varying degrees of rotation, even within the length of a single condenser.

In order to obtain the largest possible range of capacity for a given size of condenser, it is desirable to reduce the space between the electrodes as much as possible. The tubing is therefore made as thin-walled as is consistent with adequate mechanical strength and break-down voltage. However, the fact that the interior diameter of the tubing is not uniform, and is usually far from truly cylindrical, makes it necessary to provide a very loose fit between the tube and the internal electrode so as to reduce to an acceptable degree the amount of breakage due to jamming of the electrode in the tube at some point of its travel.

A further cause of breakage of tubing is the difficulty of securing perfect alignment of the traversing means for the internal electrode with the axis of the tube, thus causing binding of the electrode in the tube unless adequate clearance of the electrode in the tube is provided.

From an electrical standpoint, such clearance is disadvantageous since it reduces the capacity range of the condenser, and variations in clearance due to non-uniformity of the tubing and/or the cocking action of the traversing means causes undulations in the displacement-capacity curve of the condenser.

It is an object of the present invention to provide a trimmer condenser of the above type, which is efficient and uniform in operation, while being simple and economical in construction.

2

It is another object to provide a trimmer condenser in which the inner electrode is elastically expansive so as to conform to the interior surface of the dielectric tube.

It is another object to provide a trimmer condenser in which the inner electrode forms a complete cylinder throughout its entire range of expansion and contraction, so that such expansion or contraction causes no substantial change in the capacity of the condenser.

It is another object to provide such a device in which the traversing means for the inner electrode is arranged to permit the electrode to align itself with the axis of the dielectric tube, without introducing any lost motion or backlash, whereby the displacement-capacity curves of the condenser, traced in opposite directions, are substantially coincident.

It is another object to provide such a device in which the inner electrode may be rotated in the dielectric tube in either direction without any substantial amount of gripping or binding due to unwinding or wringing action of the contacting surfaces.

Further objects and advantages will be apparent from the following description taken in connection with the accompanying drawings, in which Fig. 1 is a side elevation partly broken away and in section of one preferred embodiment of the invention;

Fig. 2 is a section taken substantially on the line 2—2 of Fig. 1;

Fig. 3 is a plan view of the blank from which the inner electrode is formed;

Fig. 4 is an end view of the inner electrode before it is compressed for insertion into the dielectric tube;

Fig. 5 is an elevation partly broken away and in section of a second embodiment of the invention;

Fig. 6 is a section taken substantially on the line 6—6 of Fig. 5;

Fig. 7 is a plan view of a blank used to form one of the elements of the inner electrode shown in Fig. 5;

Fig. 8 is an elevation partly broken away and in section of a third embodiment of the invention;

Fig. 9 is a section taken substantially on the line 9—9 of Fig. 8;

Fig. 10 is a plan view of a blank for forming one of the elements of the inner electrode illustrated in Fig. 8;

Fig. 11 is a detail in perspective of one of the elements of the inner electrode of Fig. 8; and Fig. 12 is a detail in perspective, partly broken away, showing a further modified form of inner electrode.

In Fig. 1 of the drawing there is illustrated a dielectric tube 1 of suitable material such as glass, on which an outer electrode 2 in the form of a metallic sleeve or coating is affixed in any suitable manner. The outer electrode 2 extends, as illustrated, for somewhat less than half the length of the tube 1, and is provided with a contact member 3 for making electrical connection therewith.

The tube 1 is mounted on a threaded bushing 4 in any suitable manner as by metallizing and soldering the end of the tube. The bushing 4 is adapted to be rigidly mounted in a panel or chassis member 5 as by means of a clamp nut 6.

An elastically expansible inner electrode 7 is slidably mounted in the interior of the tube 1. This electrode is made from a ribbon 8 (Fig. 3) of sheet metal, the ends of which are rolled up so as to form substantially semi-cylindrical portions 9, 10, while the intermediate portion 11 extends crosswise as shown in Fig. 4. When this electrode 7 is compressed and inserted within the tube 1, the free ends of the semi-cylindrical portions 9, 10 overlap the mating semi-cylindrical portions as shown at 12, 13 in Fig. 2, whereby a complete cylindrical surface is formed, and are elastically pressed against the interior of the dielectric tube by the elasticity of the sheet metal.

Means for traversing the inner electrode 7 longitudinally within the dielectric tube 1 is provided comprising a screw shaft 14 which is threaded through the bushing 4 and is provided with a slot 15. A lug 16 extends laterally from the middle portion of the blank 8 so that it is located substantially centrally of the tube 1 when the inner electrode is inserted therein. This lug is arranged to enter the slot 15 of the screw shaft and is suitably fixed therein as by soldering.

When the screw shaft 14 is rotated as by means of a screw driver or other suitable instrument, it moves longitudinally through the bushing 4, which longitudinal motion is transmitted positively and without back lash or lost motion through the connection 15, 16 to the inner electrode 7 to thereby vary the telescopic relation of the electrodes 7 and 2, and thus adjust the capacity of the condenser. Since the semi-cylindrical portions 9, 10 of the inner electrode only bear on the interior of the dielectric tube 1 for slightly more than 180° of its inner circumference, there is very little unwrapping or wringing action such as might tend to interfere with the rotation of the inner electrode, so that it rotates readily in either direction. The overlapping arrangement of the resilient portions of the inner electrode cause the inner electrode to contact and conform itself to the inner surface of the dielectric tube 1 except for the very small wedge-shaped spaces 17, 18 (Fig. 2) immediately beyond the ends of the semi-cylindrical portions. Thermal contraction or expansion of the parts, and deformation of the electrode to conform with the varying contours of the interior of the dielectric tube do not change the sizes of these minute spaces 17, 18 but merely cause them to move rotarily to a slight extent. The capacity of the condenser is thus substantially unaffected by said factors.

In Figs. 5, 6 and 7 of the drawing there is illustrated a similar form of condenser in which the inner electrode is formed of two separate elements and the traversing shaft is swiveled to these elements so that the inner electrode does not rotate. A blank 19 (Fig. 7) is rolled up to form a substantially semi-cylindrical portion 21 (Fig. 6) with an inwardly extending portion 22 which is bent to form a second semi-cylindrical portion 23 of smaller diameter. The blank 19 is slotted at one edge as shown at 24, which slot, when the blank is rolled up, is adapted to accommodate a cylindrical head 25 formed on a screw shaft 26 similar to the screw shaft 14 shown in Fig. 1. When two of these elements 19 are compressed around the end of the screw shaft 26 and inserted within the dielectric tube 28 they form together an inner electrode which is swiveled by means of the connection 24, 25 to the screw shaft 26 so as to partake of its longitudinal movement without rotation. It will be understood that the elements 19 overlap each other and extend into intimate contact with the interior surface of the dielectric tube in a manner similar to the expansible inner electrode 7 shown in Figs. 1 to 3.

In Figs. 8 to 11 inclusive there is shown a form of inner electrode in which the two semi-cylindrical elements are threaded on a rotatable screw shaft which latter has a swiveled mounting so that it does not move longitudinally. Each element 29 of this inner electrode is formed from a blank as illustrated in Fig. 10, the semi-cylindrical portion 31 being bent up as shown in Fig. 11, and the crosswise extending portion 32 having tongue members 33, 34 extending radially and arranged to embrace a screw shaft 35 as shown in Fig. 9 so as to enter the threads thereof. Rotation of the screw shaft thus causes traversal of the elements 29 of the inner electrode in unison.

It has been found that although it is very difficult to obtain dielectric tubing having a true cylindrical bore, the deviations from the true cylindrical shape are generally deformations from the circular cross section, the interior circumference being usually fairly constant. In other words, the tubing may be oval, and the orientation of the major axis of the oval may vary from end to end of the tube, but the distance around the interior of the tube may be reasonably constant. In cases of this kind, it has been found desirable, after the inner electrode has been inserted, to solder the edges where they overlap for a portion at least of the length of the electrode, as illustrated in Fig. 12. When this is done, the solder fills the spaces 17, 18 shown in Fig. 2 of the drawing so as to provide for full surface contact of the inner electrode in the dielectric tube, without preventing deformation of the inner electrode in order to conform to the change in shape of the tube as the electrode moves longitudinally therein.

Although certain embodiments of the invention have been shown and described in detail, it will be understood that other embodiments are possible and that changes may be made in the design of the parts without departing from the spirit of the invention.

What is claimed is:

1. In a variable electrical condenser a tube of dielectric material, an external tubular electrode surrounding and conforming to said dielectric tube, an internal electrode formed of sheet metal rolled up to form two substantially semi-cylindrical elements the edges of which overlap and bear on the companion element, and means for traversing the inner electrode within the dielectric tube; said overlapping portions being soldered together within the dielectric tube so as to form a complete cylindrical surface therein which is deformable to follow the contour of the dielectric tube as the electrode is traversed therein.

2. In a variable electrical condenser, a tube of dielectric material, an exterior stationary electrode surrounding the tube for a portion of its length in contact therewith, an inner electrode of elastic sheet metal conforming to the interior of the tube, and means for moving the inner electrode axially in the tube to vary its telescopic relation to the outer electrode, said inner electrode being formed with circumferentially extending surfaces which overlap so as to form a complete cylinder which is deformable throughout its entire length so as to conform to and resiliently engage the inner surface of the tube irrespective of deviations in the interior contour of the tube, said inner electrode comprising a ribbon of sheet metal rolled up to conform to the interior of the dielectric tube, an inner portion of the ribbon being bent to extend crosswise of the interior of the tube, said means for moving the inner electrode axially being attached to said crosswise extending portion and including a coupling which is positive as respects longitudinal movement, but yieldingly permits misalignment of the electrode.

3. In a variable electrical condenser, a tube of dielectric material, an exterior stationary electrode surrounding the tube for a portion of its length in contact therewith, an inner electrode of elastic sheet metal conforming to the interior of the tube, and means for moving the inner electrode axially in the tube to vary its telescopic relation to the outer electrode; said inner electrode being formed with circumferentially extending surfaces which resiliently engage the interior surface of the tube and overlap so as to form a complete cylinder irrespective of deviations in the conformation of the tube and thermal variations in dimensions of the parts; in which the inner electrode comprises a ribbon of sheet metal, the middle portion of which extends crosswise of the dielectric tube, the end portions being rolled up into substantially semicylindrical form, with the free edges overlapping and bearing on the opposite semi-cylindrical portion.

4. In a variable electrical condenser, a tube of dielectric material, an exterior stationary electrode surrounding the tube for a portion of its length in contact therewith, an inner electrode of elastic sheet metal conforming to the interior of the tube, and means for moving the inner electrode axially in the tube to vary its telescopic relation to the outer electrode; said inner electrode being formed with circumferentially extending surfaces which resiliently engage the interior surface of the tube and overlap so as to form a complete cylinder irrespective of deviations in the conformation of the tube and thermal variations in dimensions of the parts; in which the inner electrode comprises a pair of substantially semi-cylindrical sheet metal elements one edge of each of which extends inwardly, crosswise of the dielectric tube, while the other edge overlaps and bears on the exterior of its companion member, said means for moving the inner electrode axially comprising a rotary shaft and cooperating means on said shaft and both said inwardly extending portions whereby rotary movement of the shaft imparts longitudinal movement to said elements in unison.

5. In a variable electrical condenser, a tube of dielectric material, an exterior stationary electrode surrounding the tube for a portion of its length in contact therewith, an inner electrode of elastic sheet metal conforming to the interior of the tube, and means for moving the inner electrode axially in the tube to vary its telescopic relation to the outer electrode; said inner electrode being formed with circumferentially extending surfaces which resiliently engage the interior surface of the tube and overlap so as to form a complete cylinder irrespective of deviations in the conformation of the tube and thermal variations in dimensions of the parts; in which the inner electrode comprises a pair of substantially semi-cylindrical sheet metal elements one edge of each of which extends inwardly, crosswise of the dielectric tube, while the other edge overlaps and bears on the exterior of its companion member, said means for moving the inner electrode axially comprising a rotary shaft and cooperating means on said shaft and both said inwardly extending portions whereby rotary movement of the shaft imparts longitudinal movement to said elements in unison, and in which said means for moving the inner electrode axially comprises a threaded shaft, a rigidly mounted nut threaded on the shaft, and a swivel connection between said inwardly extending portions of the inner electrode and said shaft.

6. In a variable electrical condenser, a tube of dielectric material, an exterior stationary electrode surrounding the tube for a portion of its length in contact therewith, an inner electrode of elastic sheet metal conforming to the interior of the tube and means for moving the inner electrode axially in the tube to vary its telescopic relation to the outer electrode; said inner electrode being formed with circumferentially extending surfaces which resiliently engage the interior surface of the tube and overlap so as to form a complete cylinder irrespective of deviations in the conformation of the tube and thermal variations in dimensions of the parts; in which the inner electrode comprises a pair of substantially semi-cylindrical sheet metal elements one edge of each of which extends inwardly, crosswise of the dielectric tube, while the other edge overlaps and bears on the exterior of its companion member, said means for moving the inner electrode axially comprising a rotary shaft and cooperating means on said shaft and both said inwardly extending portions whereby rotary movement of the shaft imparts longitudinal movement to said elements in unison, and in which said means for moving the inner electrode axially comprises a threaded shaft, and a swivel mount for said shaft; and said inwardly extending portions are provided with lugs which engage the threads of the shaft whereby rotation of the shaft moves the elements axially within the dielectric tube.

HOWARD M. WADSWORTH.

REFERENCES CITED

The following references are of record in the file of this patent:

UNITED STATES PATENTS

| Number | Name | Date |
| --- | --- | --- |
| 2,316,257 | Krastin | Apr. 13, 1943 |

FOREIGN PATENTS

| Number | Country | Date |
| --- | --- | --- |
| 216,038 | Great Britain | May 22, 1924 |
| 669,076 | France | July 27, 1929 |
| 602,270 | Germany | Sept. 5, 1934 |